(12) United States Patent
Yakobson et al.

(10) Patent No.: US 6,380,268 B1
(45) Date of Patent: Apr. 30, 2002

(54) PLASMA REFORMING/FISCHER-TROPSCH SYNTHESIS

(76) Inventors: Dennis L. Yakobson, 12544 W. 87th Ave., Arvada, CO (US) 80005; John S. Vavruska, 872 Don Cubero Ave., Santa Fe, NM (US) 87501; Edward Bohn, 15722 14 Place SW., Burien, WA (US) 98166; Andreas Blutke, 2456 Alki Ave. SW., Apt. 303, Seattle, WA (US) 98116

( * ) Notice: Subject to any disclaimer, the term of this patent is extended or adjusted under 35 U.S.C. 154(b) by 0 days.

(21) Appl. No.: 09/560,248

(22) Filed: Apr. 27, 2000

Related U.S. Application Data

(60) Provisional application No. 60/131,459, filed on Apr. 28, 1999.

(51) Int. Cl.⁷ .............................. C07C 27/00; B23K 9/00
(52) U.S. Cl. .................... 518/700; 518/702; 219/121.36
(58) Field of Search .................... 512/700; 518/702; 219/121.36

(56) References Cited

U.S. PATENT DOCUMENTS

| | | |
|---|---|---|
| 3,593,712 A | 7/1971 | Weaver et al. |
| 3,641,308 A | 2/1972 | Couch, Jr. et al. |
| 3,738,824 A | 6/1973 | Davis et al. ............... 75/0.5 B |
| 3,840,750 A | 10/1974 | Davis et al. |
| 3,954,954 A | 5/1976 | Davis et al. |
| 4,040,976 A | 8/1977 | Greene |
| 4,166,799 A | 9/1979 | Giacobbe |
| 4,181,504 A | 1/1980 | Camacho |
| 4,606,799 A | 8/1986 | Pirklbauer et al. |
| 5,382,748 A | 1/1995 | Behrmann et al. |
| 5,500,449 A | 3/1996 | Benham et al. |
| 5,504,118 A | 4/1996 | Benham et al. |
| 5,620,670 A | 4/1997 | Benham et al. |
| 5,621,155 A | 4/1997 | Benham et al. |
| 5,749,937 A | 5/1998 | Detering et al. |
| 5,993,761 A | 11/1999 | Czernichowski et al. |
| 6,153,852 A | * 11/2000 | Blutke et al. .......... 219/121.59 |

FOREIGN PATENT DOCUMENTS

| | | |
|---|---|---|
| DE | 343160 | 2/1931 |
| EP | 98/30524 | 7/1998 ............. C07C/5/32 |

* cited by examiner

Primary Examiner—Sreeni Padmanabhan
Assistant Examiner—J. Parsa
(74) Attorney, Agent, or Firm—Rick Martin; Patent Law Offices of Rick Martin, P.C.

(57) ABSTRACT

Fischer-Tropsch (FT) products are formed in a plant utilizing a combination of a plasma reformer reactor (9) and an FT reactor (19). Feedstocks ranging from gases such as methane and natural gas to solids such as petroleum coke and coal are plasma reformed with water and/or $CO_2$ to produce one or more of hydrogen, oils, liquid alkanes and oxygenated alkanes, oil and waxes.

The specific ancillary equipment, e.g., boilers (16), preheaters, condensers (22) (24), gas liquid separators (19) (25), compressors (18) (18a), etc. will be combined or omitted as needed for treatment of desired raw materials as shown by the Figures.

3 Claims, 2 Drawing Sheets

PLASMA REFORMING/FISCHER-TROPSCH SYNTHESIS

CROSS-REFERENCE TO RELATED APPLICATION

This application is a non-provisional application claiming the benefits of provisional application No. 60/131,459, filed Apr. 28, 1999.

FIELD OF THE INVENTION

This invention relates to plasma reforming of feedstocks to provide a syngas which is converted to higher molecular weight hydrocarbons using a Fischer-Tropsch (FT) reactor and process.

BACKGROUND OF THE INVENTION

Environmental, health and safety concerns are leading to requirements that offshore oil production rigs cannot flare their low value hydrocarbon gases. In such cases, the gases must be compressed for pipeline or shipboard transport to on-shore facilities. Refinery flare gases and/or bottoms can also be upgraded to more valuable products where feasible using a portion of the flare gas or feedstock and heating the reactors where necessary.

There have been a variety of approaches to reforming using plasmas. U.S. Pat. No. 5,993,761 to Piotr Czernichowski et al explores this area well. Charles B. Benham et al explores explore FT synthesis as a mechanism for upgrading reformer products, e.g., U.S. Pat. No. 5,504,118, U.S. Pat. No. 5,500,449; U.S. Pat. No. 5.620,670 and U.S. Pat. No. 5,621,155. Both groups are working in economic niches where tax incentives, regulatory penalties, etc., must combine with other factors to contribute to the worth of the use of the processes. This is true even where there is a cheap raw material source, e.g., $CO_2$ availability from a nearby well.

SUMMARY OF THE INVENTION

The invention combines now plants for the manufacture of FT products utilizing a plasma reformer to provide the syngas feed and the processes necessary to obtain the desired FT products. The new plants include the a) reformer and FT reactor combined plants in packaged form where the plants are integrated with a large barge or a ship and assemblable packages, i.e., kits for plant assembly on site.

BRIEF DESCRIPTION OF THE DRAWINGS

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
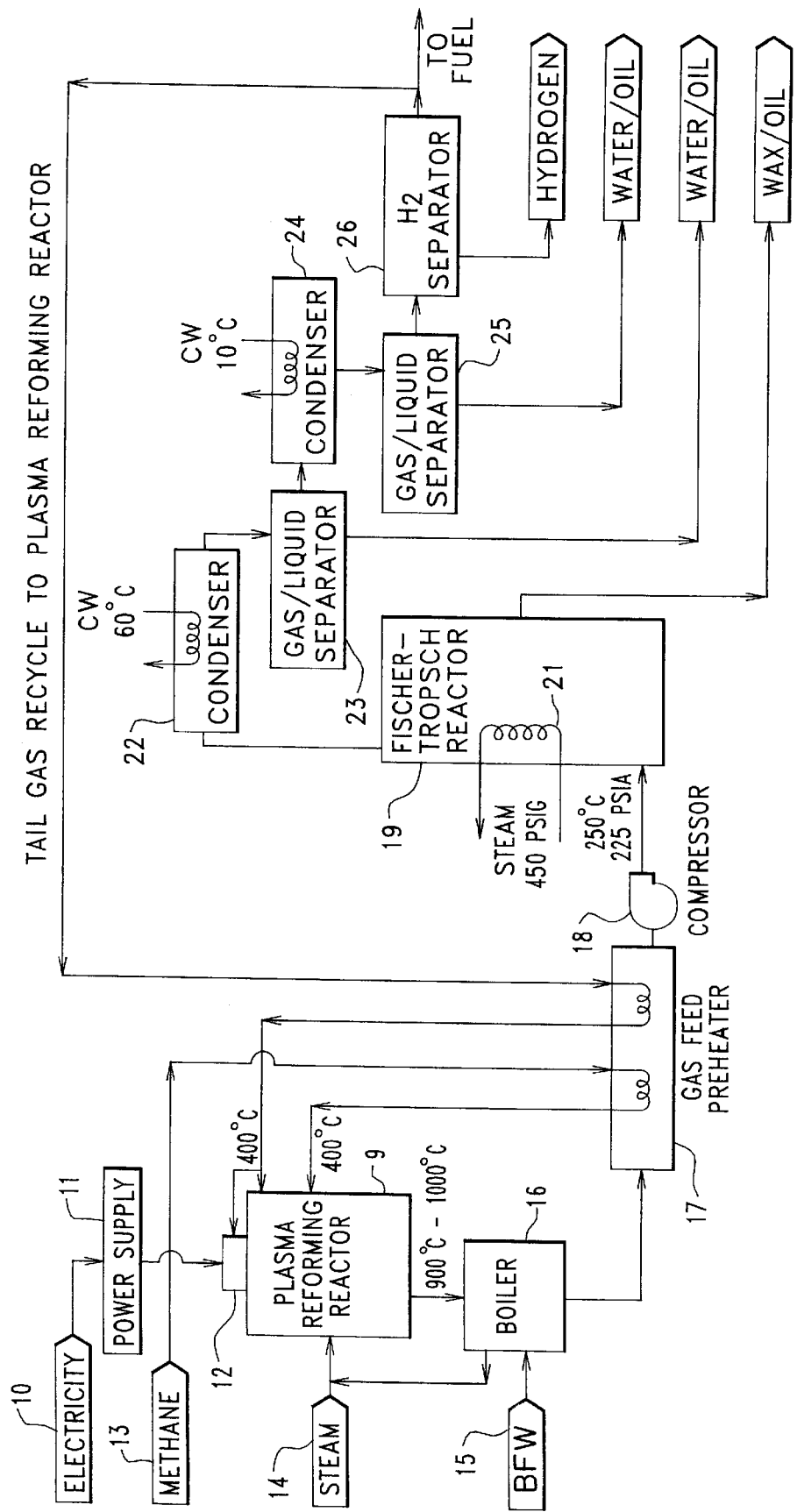
FIG. 1 depicts a combined plasma reformer and Fischer-Tropsch plant for the production of Fischer-Tropsch products from natural gas.

The process of FIG. 1 is carried out in a plasma reforming reactor 9. The electrical feed 10 is conditioned by power supply 11 to operate within the frequency range of 0.37–0.44 mHz. The conditional feed 10 is supplied to plasma generator 12 which initiates and controls the plasma formation in the reactor 9. A methane gas or other low molecular weight gaseous hydrocarbon feed 13 is heated to about 400° C. for purposes of this discussion and introduced into reactor 9 directly or through the plasma generator 12. Steam 14 is also fed to reactor 9. Carbon dioxide can also be introduced into reactor 9 as a substitute for steam to reduce to eliminate any carbon deposition on the catalyst.

Preconditioned "tap" or other water is stored in boiler feed water tank 15 before injection into boiler 16 where it is preheated by heat exchange with the hot gases from reactor 9 and introduced into reactor 9. The 900°–1000° C. gases from reactor 9 are cooled in boiler 16 and introduced into gas feed preheater 17 where it is used to heat the gas feed. The cooled reactor 9 effluent is then run through compressor 18 and introduced into a FT reactor 19 at about 250° C. and 225 psig. Reactor 19 temperatures are regulated, inter alia, by heat exchange coil 21.

The reaction products from FT unit 19 are cooled in condenser 24 with 60° C. plant water. The cooled reaction products are then separated into gaseous and liquid fractions in separator 25. The gases are condensed in condenser 24 with about 10° C. coolant and passed through gas/liquid separator 25 to break out a water/oil fraction. The gases are passed through the hydrogen separator 26. The tail gas is recycled to the preheater 17 and fed to the reactor 9. The product fractions from the FT reactor 9 further include wax/oil, water/oil and hydrogen.

Computer runs were made to evaluate the operation of the plant of FIG. 1. In the case of natural gas, both tail gas recycle after hydrogen removal and carbon dioxide recycle were investigated. In the other two cases, tail gas recycle without hydrogen removal and carbon dioxide recycle were investigated. In all cases, the feedstock flow-rate was 1000 tons per day.

The outlet pressure of the plasma reactor was assumed to be 15 psig and the outlet temperature was 1832° F. for natural gas and 2100° F. for the other two feedstocks. It was assumed that the gases at the outlet of the plasma reactor were in equilibrium at the exit temperature. The efficiency of the plasma in converting electrical energy into thermal energy was assumed to be 70%. The FT reactor inlet pressure was assumed to be 250 psig. Therefore, compression of the synthesis gas exiting the plasma rector was required. The compression power was calculated using an isentropic efficiency of 70%. It was assumed in all cases that the FT reactor connoted 90% of the incoming carbon monoxide. The liquid hydrocarbon products ($C_6$+) produced in the FT reactor were modeled assuming a dual-slope Anderson-Schultz-Flory carbon number distribution ($\alpha 1$= 0.69 and $\alpha 2$=0.95), a water gas shift constant of 10 was assumed. It was assumed that electrical power would be produced by a combined cycle unit from the tail gas (which was not recycled) at an efficiency of 55% based on lower heating value. It was further assumed that additional electric power would be generated from steam derived from cooling the plasma and FT outlet gases and from cooling the FT reactor. The efficiency of the steam-generated power was assumed to be 33%.

The following composition of natural gas was used in the calculations:

| | |
|---|---|
| $CH_4$ | 89.00 vol % tail gas |
| $C_2H_6$ | 6.63 |
| $C_3H_8$ | 0.71 |
| $CO_2$ | 2.95 |
| $N_2$ | 0.71 |

A diagram of a plasma-based system for reforming natural gas is shown in FIG. 1. In Table 1, results are tabulated for a natural gas feedstock with recycle of tail gas from the FT reactor and removal of hydrogen from the system. The first entry having 0% tail gas recycle is a baseline case wherein 30% of the hydrogen from the plasma reactor is removed upstream of the FT reactor to reduce the $H_2$:CO ratio of the gas exiting the plasma reactor from 2.85 to 1.99 which is considered to be a practical maximum value for an iron-based FT catalyst. In the other cases in Table 1, 90% of the hydrogen Is removed downstream of the FT reactor (from the tail gas). With the requisite amount of steam added to the plasma reactor, the minimum possible $H_2$:CO ratio is 1.55 when 90% tail gas recycle is employed. It can be seen that increased steam addition increases the $H_2$:CO ratio and decreases hydrocarbon yield.

TABLE 1

Plasma Reforming of Natural Gas with Tail Gas Recycle

| Tail Gas Recycle % | Steam Fed to Plasma Lb/Lb Feed | FT $H_2$:CO | Yield $C_5$+ Bbl/ton Feed | Plasma Energy kWh/Lb $C_5$+ | Imported Energy kWh/Lb $C_5$+ |
|---|---|---|---|---|---|
| 0 | 1.064 | 1.99 | 3.118 | 7.317 | 3.986 |
| 90 | 1.281 | 1.55 | 5.413 | 5.403 | 4.152 |
| 90 | 1.486 | 1.6 | 5.401 | 5.486 | 4.203 |
| 90 | 1.894 | 1.7 | 5.384 | 5.644 | 4.302 |
| 90 | 2.298 | 1.8 | 5.372 | 5.798 | 4.400 |
| 90 | 2.597 | 1.9 | 5.360 | 5.947 | 4.495 |

In Table 2 are shown the results for the case wherein $CO_2$ is removed from the tail gas and recycled to the plasma reactor. In this case no $H_2$ removal is necessary since the hydrogen reacts with the $CO_2$ in the plasma reactor. The minimum amount of steam required in this case is about 0.65 pounds per pound of natural gas fed to the plasma reactor. This gives a $H_2$:CO ratio of 1.6. As additional steam is added to increase the $H_2$:CO ratio to 1.9, the yield increases slightly but the energy required by the plasma increases significantly. The tail gas recycle case which produces the highest $C_5$+ yield produces about 21% more yield than the best $CO_2$ recycle case, but this tail gas recycle case requires about 11% more electrical energy to be imported.

TABLE 2

Plasma Reforming of Natural Gas with $CO_2$ Recycle

| $CO_2$ Recycle % | Steam Fed to Plasma Lb/Lb Feed | FT $H_2$:CO | Yield $C_5$+ Bbl/ton Feed | Plasma Energy kWh/Lb $C_5$+ | Imported Energy kWh/Lb $C_5$+ |
|---|---|---|---|---|---|
| 0 | 1.064 | 1.99 | 3.118 | 7.317 | 3.986 |
| 98 | 0.847 | 1.60 | 4.413 | 5.623 | 3.322 |
| 98 | 1.073 | 1.70 | 4.413 | 5.797 | 3.476 |
| 98 | 1.492 | 1.80 | 4.461 | 5.964 | 3.621 |
| 98 | 1.851 | 1.90 | 4.467 | 6.132 | 3.740 |

Figure 2:
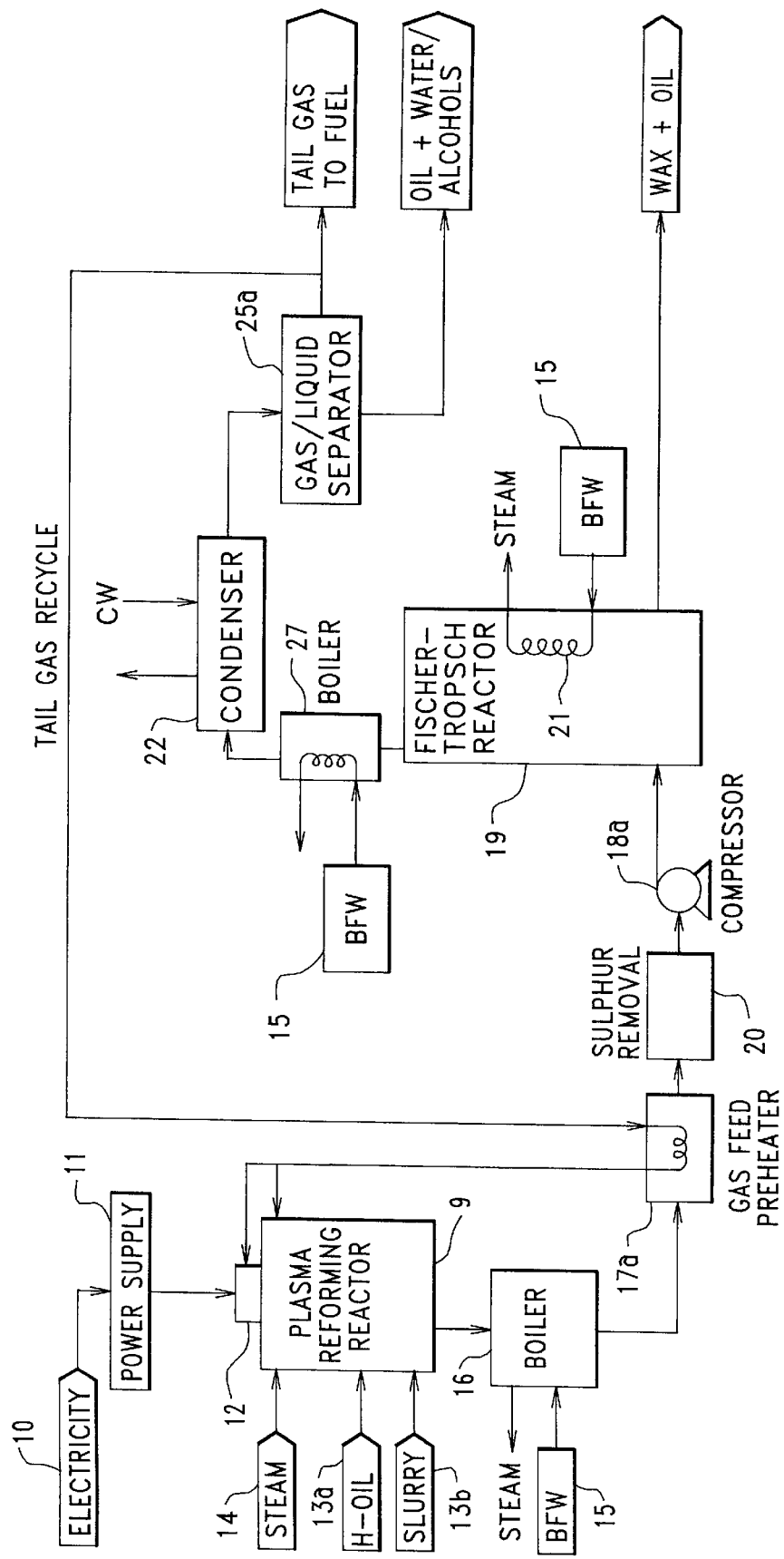
FIG. 2 depicts a variation on the reactor of FIG. 1 adapted for the production of Fischer-Tropsch liquids from liquids such as H-Oil and solids such as petroleum coke slurries.

A diagram of a system for reforming refinery bottoms (H-Oil) is shown in FIG. 2.

In the plant of FIG. 2, the tail gas recycle loop and the hydrogen separator are eliminated. A condenser is added with the elimination of hydrogen as a product and the addition of alcohols. The same identification numerals used in FIG. 1 are utilized in FIG. 2 except as new elements are added. Modifications are indicated by the addition of alphabetic suffixes.

The H-Oil feed 13a is pumped into reactor 9 along with steam from source 14. The reactor 9 products are piped to boiler 16 from whence steam is recycled to reactor 9 via source 14. The reactor 9 products are used to heat the recycled tail gas via the preheater 17a prior to its return to the inductively coupled plasma generator 12 and reactor 9. Where the H-oil is sour, it is desulfurized in separator 20, passed through compressor 18a and introduced into FT reactor 19. Boiler feed water 15 is passed through coil 21 to form 450 psig steam for recycle to reactor 9.

The FT products from FT reactor 19 are passed through boiler 27 to heat boiler fed water for recycle. The cooler FT products are then passed through condenser 22 for further cooling and then through separator 25a to separate oil, water and alcohols from the tail gas to be recycled for use as fuel and feed for reactor 9.

The composition of H-Oil used in the calculations is as follows:

| | Wt. % |
|---|---|
| Carbon | 84.33 |
| Hydrogen | 8.89 |
| Nitrogen | 1.12 |
| Sulphur | 5.56 |
| Ash | 0.10 |

The higher heating value of the H-Oil is 17,084 Btu per pound. As in the natural gas case, calculations were performed for a) recycle of a portion of the tail gas to the plasma reactor and b) for separation of carbon dioxide from the tail gas and recycling a portion of the carbon dioxide to the plasma reactor. Due to the lower hydrogen content of H-Oil compared to natural gas, hydrogen removal from the system is not required. In Table 3, calculated results are tabulated for different amounts of recycle of tail gas. As tail gas recycle is increased, the amount of steam required is reduced and the hydrocarbon yield is increased by 67%. Also, the plasma energy requirement drops by 21% as tail gas recycle increases. However, the amount of electrical energy imported increases by 44% as the tail gas recycle increases.

TABLE 3

Plasma Reforming of H-Oil with Tail Gas Recycle

| Tail Gas Recycle % | Steam Fed to Plasma Lb/Lb Feed | FT $H_2$:CO | Yield $C_5$+ Bbl/ton Feed | Plasma Energy kWh/Lb $C_5$+ | Imported Energy kWh/Lb $C_5$+ |
|---|---|---|---|---|---|
| 0 | 1.379 | 1.65 | 3.509 | 6.020 | 2.871 |
| 10 | 1.354 | 1.63 | 3.683 | 5.892 | 3.055 |
| 20 | 1.317 | 1.60 | 3.881 | 5.755 | 3.216 |
| 30 | 1.266 | 1.56 | 4.099 | 5.813 | 3.381 |
| 40 | 1.215 | 1.51 | 4.342 | 5.471 | 3.542 |
| 50 | 1.151 | 1.44 | 4.615 | 5.325 | 3.698 |
| 60 | 1.086 | 1.35 | 4.919 | 5.184 | 4.127 |
| 70 | 0.954 | 1.19 | 5.270 | 5.013 | 3.974 |
| 80 | 0.762 | 0.92 | 5.661 | 4.838 | 4.074 |
| 85 | 0.643 | 0.10 | 5.864 | 4.780 | 4.133 |

In Table 4 are shown the results for the H-Oil feedstock wherein $CO_2$ is removed from the tail gas and recycled to the plasma reactor. As $CO_2$ recycle is increased, the amount of steam required is reduce and the $H_2$:CO ratio decreases. The yield increases by 27% and the amount of imported electrical energy increases by about 19%. The 85% tail gas recycle case which produces the highest $C_5$+ yield produces about 31% more yield than the best $CO_2$ recycle case, but the tail gas recycle case requires about 21% more electrical energy to be imported.

TABLE 4

Plasma Reforming of H-Oil with $CO_2$ Recycle

| $CO_2$ Recycle % | Steam Fed to Plasma Lb/Lb Feed | FT $H_2$:CO | Yield $C_5$+ Bbl/ton Feed | Plasma Energy kWh/Lb $C_5$+ | Imported Energy kWh/Lb $C_5$+ |
|---|---|---|---|---|---|
| 0  | 1.379 | 1.65 | 3.509 | 6.020 | 2.871 |
| 10 | 1.353 | 1.57 | 3.580 | 5.953 | 2.922 |
| 20 | 1.304 | 1.47 | 3.661 | 5.868 | 2.971 |
| 30 | 1.235 | 1.37 | 3.753 | 5.768 | 3.019 |
| 40 | 1.188 | 1.27 | 3.851 | 5.659 | 3.085 |
| 50 | 1.092 | 1.15 | 3.970 | 5.575 | 3.142 |
| 60 | 1.024 | 1.03 | 4.100 | 5.490 | 3.227 |
| 70 | 0.903 | 0.90 | 4.260 | 5.373 | 3.310 |
| 80 | 0.741 | 0.75 | 4.457 | 5.240 | 3.404 |

FIG. 2 provides for a solid feedstock. Petroleum coke is utilized here. The only difference between this process and the H-Oil process is that water must be used rather than steam to from the solid petroleum coke slurry. The latent heat of vaporization of the water must be supplied by the plasma; therefore, reforming of solids is less energy efficient than reforming liquids or gases. The assumed composition of petroleum coke used in the calculations is:

|  | Wt. % |
|---|---|
| Carbon | 88.94 |
| Hydrogen | 3.92 |
| Oxygen | 0.10 |
| Nitrogen | 1.51 |
| Sulphur | 5.53 |
| Ash | 0.50 |

The higher heating value of the petroleum coke is 15400 Btu per pound. As in the previous case, calculations were performed for a) recycle of a portion of the tail gas to the plasma reactor and b) for separation of carbon dioxide from the tail gas and recycling a portion of the carbon dioxide to the plasma reactor. Due to the low hydrogen content of petroleum coke, hydrogen removal from the system is not required, In Table 5, calculated results are tabulated for different amounts of recycle of tail gas. As tail gas recycle is increased, the amount of steam required is reduced and the hydrocarbon yield is increased by 39%. Also, the plasma energy requirement drops 21% as tail gas recycle increases. Unlike the H-Oil case, the amount of electrical energy imported decreases as tail gas recycle increases.

TABLE 5

Plasma Reforming of Petroleum Coke with Tail Gas Recycle

| Tail Gas Recycle % | Steam Fed to Plasma Lb/Lb Feed | FT $H_2$:CO | Yield $C_5$+ Bbl/ton Feed | Plasma Energy kWh/Lb $C_5$+ | Imported Energy kWh/Lb $C_5$+ |
|---|---|---|---|---|---|
| 0  | 1.488 | 1.30 | 3.469 | 7.082 | 5.058 |
| 10 | 1.420 | 1.25 | 3.643 | 6.836 | 4.465 |
| 20 | 1.374 | 1.20 | 3.833 | 6.605 | 4.507 |
| 30 | 1.334 | 1.14 | 4.040 | 6.385 | 4.555 |
| 40 | 1.261 | 1.06 | 4.272 | 6.124 | 4.565 |
| 50 | 1.165 | 0.95 | 4.531 | 5.850 | 4.558 |
| 60 | 1.046 | 0.80 | 4.815 | 5.575 | 4.537 |

FIG. 2 provides for the Introduction of a petroleum coke or other slurry, e.g., a coal slurry, through slurry pump 13*b*.

In Table 6 are shown the results for the petroleum coke feedstock wherein $CO_2$ is removed from the tail gas and recycled to the plasma reactor. As $CO_2$ recycle is increased, the amount of steam required is reduced and the $H_2$:CO ratio decreases. The yield increases by 18% and the amount of imported electrical energy decreases by about 17%. The 60% tail gas recycle case which produces the highest $C_5$+ yield produces about 17% more yield than the best $CO_2$ recycle case, but the tail as recycle case requires about 8% more electrical energy to be imported.

TABLE 6

Plasma Reforming of Petroleum Coke with $CO_2$ Recycle

| $CO_2$ Recycle % | Steam Fed to Plasma Lb/Lb Feed | FT $H_2$:CO | Yield $C_5$+ Bbl/ton Feed | Plasma Energy kWh/Lb $C_5$+ | Imported Energy kWh/Lb $C_5$+ |
|---|---|---|---|---|---|
| 0  | 1.468 | 1.30 | 3.469 | 7.082 | 5.058 |
| 10 | 1.415 | 1.21 | 3.547 | 6.917 | 4.391 |
| 20 | 1.371 | 1.12 | 3.629 | 8.775 | 4.373 |
| 30 | 1.292 | 1.02 | 3.727 | 6.568 | 4.312 |
| 40 | 1.215 | 0.92 | 3.835 | 6.379 | 4.271 |
| 50 | 1.132 | 0.82 | 3.958 | 6.184 | 4.235 |
| 60 | 1.022 | 0.70 | 4.103 | 5.959 | 4.186 |

Based on the calculations, the following conclusions can be drawn:

i) Tail gas recycle is generally superior to carbon dioxide recycle.

ii) Carbon dioxide removal prior to the FT reactor is unnecessary at the low plasma pressure assumed.

iii) In all cases, imported electrical power will be required.

GENERAL TEACHING OF THE INVENTION

Preferably, a natural gas feed is utilized as a raw material but refinery residuals such as H-oil, and coal or coke can also be utilized as feeds in variations of the overall process just described. The plant can be a prefabricated unit mounted on a barge or larger vessel, a unit assembled on an oil or gas offshore platform, or other site, or a "kit" made up of the components of a predesigned plant packaged for usage under the conditions required to effectively recover FT products. The feedstocks are preferably hydrocarbons but can include oxygen, nitrogen, sulphur and various other elements to the extent that the substantially hydrocarbon characteristics of the feedstock remain present. Thus, where sulphur, various metals, or other materials are a component of the feedstock, the plant must include equipment and ancillary process steps necessary for removing these materials. Similarly, solid feedstocks must be ground to predetermined sizes for assembly at a coal field or other deposit. Where the feedstock is solid, e.g., coal or a coke, it must be ground to a powder of predetermined sized particles.

Although the present invention has been described with reference to preferred embodiments, numerous modifications and variations can be made within the scope of the invention. No limitation with respect to the specific embodiments disclosed herein is intended or should be inferred.

We claim:

1. In a process for the production of Fischer-Tropsch hydrocarbon products from at least one gas, liquid or solid, substantially hydrocarbon feedstock, the improvement comprising conducting reforming in an electric powered plasma reactor operating at frequencies at from about 0.37 to about 0.44 mHz and the formation of Fischer-Tropsch hydrocarbons in a Fischer-Tropsch reactor having at least one recycle line from the Fischer-Tropsch reactor to the plasma reactor and recycling at least one of $CO_2$ and tail gas from the Fischer-Tropsch reactor to the plasma reactor during reformer operations.

2. The process of claim 1 wherein the plasma reactor is inductively coupled and $CO_2$ is recycled from the Fischer-Tropsch reactor to the plasma reactor.

3. The process of claim 1 wherein the plasma reactor is inductively coupled and tail gas is recycled from the Fischer-Tropsch reactor to the plasma reactor.

* * * * *